US011720662B2

(12) United States Patent
Alban et al.

(10) Patent No.: US 11,720,662 B2
(45) Date of Patent: Aug. 8, 2023

(54) LIGHTWEIGHT ELECTRONIC CONTROL UNIT FINGERPRINTING

(71) Applicant: Intel Corporation, Santa Clara, CA (US)

(72) Inventors: Eduardo Alban, Hillsboro, OR (US); Shabbir Ahmed, Beaverton, OR (US); Marcio Juliato, Portland, OR (US); Christopher Gutierrez, Hillsboro, OR (US); Qian Wang, Portland, OR (US); Vuk Lesi, Cornelius, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 407 days.

(21) Appl. No.: 16/994,219

(22) Filed: Aug. 14, 2020

(65) Prior Publication Data

US 2020/0372148 A1 Nov. 26, 2020

(51) Int. Cl.
*G06F 21/44* (2013.01)
*G06F 21/85* (2013.01)
*H04L 12/40* (2006.01)
*G06F 13/20* (2006.01)

(52) U.S. Cl.
CPC .............. *G06F 21/44* (2013.01); *G06F 13/20* (2013.01); *G06F 21/85* (2013.01); *H04L 12/40* (2013.01); *H04L 2012/40215* (2013.01); *H04L 2012/40273* (2013.01)

(58) Field of Classification Search
CPC .......... G06F 21/44; G06F 21/85; G06F 21/73; G06F 13/20; H04L 12/40; H04L 2012/40215; H04L 2012/40273; H04L 63/1416; H04L 63/1425
See application file for complete search history.

(56) References Cited

U.S. PATENT DOCUMENTS

| | | |
|---|---|---|
| 2017/0318044 A1 | 11/2017 | Dagmi et al. |
| 2018/0248766 A1* | 8/2018 | Ezra .................... H04L 63/1416 |
| 2019/0245872 A1* | 8/2019 | Shin ........................ H04L 12/40 |
| 2020/0128031 A1 | 4/2020 | Juliato et al. |
| 2021/0176246 A1* | 6/2021 | Chapman .......... H04L 12/40013 |

FOREIGN PATENT DOCUMENTS

| | | |
|---|---|---|
| EP | 3471371 A1 | 4/2019 |
| WO | 2018013171 A1 | 1/2018 |

OTHER PUBLICATIONS

European Search Report and Written Opinion for the European Patent Application No. EP21183907, dated Dec. 17, 2021, 8 pages.

* cited by examiner

*Primary Examiner* — Nelson S. Giddins
(74) *Attorney, Agent, or Firm* — KDW Firm PLLC

(57) ABSTRACT

Systems, apparatuses, and methods to identify an electronic control unit transmitting a message on a communication bus, such as an in-vehicle network bus, are provided. ECUs transmit messages by manipulating voltage on conductive lines of the bus. Observation circuitry can observe voltage signals associated with the transmission at a point on the in-vehicle network bus. A distribution can be generated from densities of the voltage signals. ECUs can be identified and/or fingerprinted based on the distributions.

22 Claims, 11 Drawing Sheets

LIGHTWEIGHT ELECTRONIC CONTROL UNIT FINGERPRINTING

BACKGROUND

Modern automobiles include a number of sensors, controllers, and processors. These devices often communicate signals and/or messages via a common bus. For example, an in-vehicle network (IVN) can be used to send messages between devices in a vehicle. Identification of the device transmitting a message is important for an overall intrusion detection system (IDS). An IDS may be used to reduce risk of attacks aimed to disable, overtake, reprogram, or otherwise inhibit the safe operation of the system in which the network is deployed, such as, an automobile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
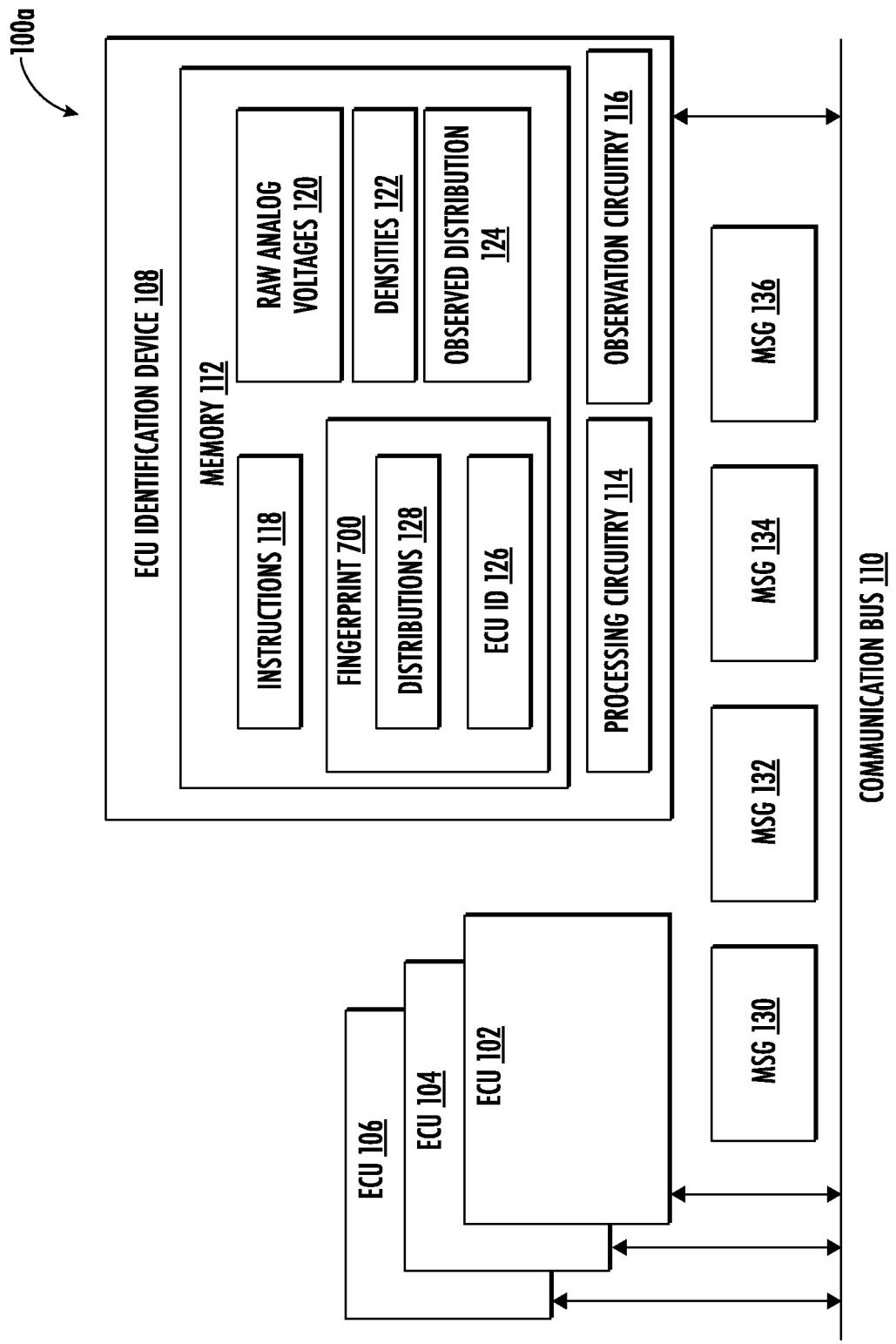
FIG. 1A illustrates a System 100 in accordance with one embodiment.

Various embodiments of the present disclosure are directed to providing "online" or "real time" fingerprinting of electronic control units (ECUs) transmitting messages on a communication bus. Conventional fingerprinting techniques require a high amount of computational resources to meet latency requirements for real time operations. Furthermore, typical conventional fingerprinting techniques rely on machine learning models, which have high compute storage requirements.

In general, the present disclosure provides to fingerprint ECUs based on their analog waveform. It is to be appreciated that analog waveform data (e.g., associated with various ECUs transmitting on a bus, or the like) can be captured. The present disclosure provides to derive a density, using a kernel based density function (e.g., a probability density function (PDF), or the like) of the analog waveforms. From the kernel based density, unique distributions for individual ECUs can be identified based on a cumulative distribution function (CDF). Individual ECUs can be fingerprinted based on these CDFs.

The present disclosure can be applied to fingerprint ECUs for a variety of communication busses, which can be implemented in many different contexts, such as, for example, industrial networks, vehicular networks, manufacturing networks, retail operation networks, warehousing networks, or the like. Although vehicular networks are often used in this description as an example implementation, the claims are not limited to networks implemented in a vehicle. However, using vehicles as an example, modern vehicles have many (often hundreds) of electronic control units (ECUs) for various subsystems. For example, there are multiple ECUs for engine control, transmission, airbags, antilock braking, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

These ECUs generate data and/or commands and/or consume data and/or commands. For example, a collision avoidance ECU may need to consume data from ECU speed sensors and or an ECU object sensor (e.g., radar, a camera, or the like). Accordingly, the ECUs in an automobile are often communicatively coupled via an in-vehicle network (IVN).

To that end, this disclosure provides to identify the source of messages, for example, those communicated via an IVN. Specifically, this scheme describes an approach based on density functions as outlined above. It is noted that this provides ECU fingerprinting that requires less computational overhead (e.g., compute resources and well as storage resources) than conventional methods.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1A illustrates an example system 100, which can be implemented in a vehicle, such as, for example, an automobile, a motorcycle, an airplane, a boat, a personal watercraft, an all-terrain vehicle, or the like. System 100 includes a number of electronic control units (ECUs), for example, ECU 102, ECU 104, and ECU 106 are depicted. System 100 further includes ECU identification device 108. System 100 includes a communication bus 110, which can be a CAN bus, a FlexRay bus, a CAN FD bus, an automotive ethernet bus, or a local interconnected network (LIN) bus. Additionally, where implemented in contexts outside of the automotive space, the communication bus 110 can be a network bus adapted to the particular implementation, such as, for example, a communication network for manufacturing equipment, or the like.

In general, each of ECU 102, ECU 104, and ECU 106 include circuitry arranged to generate messages and transmit the messages onto communication bus 110 and/or consume messages from communication bus 110. The depicted ECUs (e.g., ECU 102, ECU 104, and ECU 106) can be any of a variety of devices, such as, for example, sensor devices, actuator devices, microprocessor control devices, or the like. For example, the ECUs include circuitry arranged to manipulate voltage levels on communication bus 110 (e.g., see FIG. 2) to communicate messages via the communication bus 110. As depicted, system 100 includes ECU 102, ECU 104, and ECU 106. This is done for clarity of presentation. However, in practice (e.g., in a modern automobile, or the like) hundreds of ECUs may be provided in system 100.

As stated, ECUs are arranged to generate and/or consume messages, where the messages can include data or commands. Specifically, ECUs can convey messages via communication bus 110. As such, messages are depicted on communication bus 110. In particular, this figure depicts a number of messages (MSGs), such as, message 130, message 132, message 134, and message 136. The number of messages is depicted for purposes of clarity and ease of explanation. Many IVN standards, however, do not provide for indicating source information on the bus. Furthermore, many IVN schemes do not have sufficient bandwidth for conventional cryptography techniques useful to indicate the source of messages.

ECU identification device 108 includes memory 112, processing circuitry 114, and observation circuitry 116. Memory 112 includes instructions 118 (e.g., firmware, or the like) that can be executed by processing circuitry 114 and/or observation circuitry 116. During operation, observation circuitry 116 can observe voltage levels on communication bus 110, for example, at point 138. The observed voltage levels on communication bus 110 can be stored as raw analog voltages 120. For example, processing circuitry 114 can execute instructions 118 to store voltages observed by observation circuitry 116 as raw analog voltages 120.

Processing circuitry 114 can execute instructions 118 to generate densities 122 from raw analog voltages 120 and observed distribution 124 from densities 122. This is explained in greater detail below. However, in general, processing circuitry 114 can execute instructions 118 to generate a PDF (e.g., densities 122) from the analog waveforms (e.g., raw analog voltages 120) and generate a CDF (e.g., observed distribution 124) from the PDF. ECUs (e.g., ECU 102, ECU 104, ECU 106, etc.) can be fingerprinted based on the CDFs. Further examples of this are given below.

Processing circuitry 114, in executing instructions 118 can compare the observed distribution 124 to distributions 128 from a fingerprint 600 to determine an identity of an ECU sending the message (e.g., message 130 message 132, message 134, or message 136). With some examples, processing circuitry 114, in executing instructions 118 can determine the identity based on ECU IDs 126 associated with the distributions 128 from fingerprint 600. In some examples, processing circuitry 114, in executing instructions 118 can compare the observed distribution 124 to a distributions 128 from a fingerprint 600 to determine an authenticity of an ECU sending the message associated with the observed distribution 124 (e.g., based on ECU IDs 126, or the like). In some examples, observed distribution 124 can be compared to distributions 128 from fingerprint 600 using statistical comparison algorithms, machine learning, image recognition, or other signal processing algorithms. As a specific example, processing circuitry 114 in executing instructions 118 can compare observed distribution 124 to distributions 128 using a minimum mean square error (MMSE) metric to match a distribution from the observed distribution 124 to a distribution from the distributions 128. More specifically, processing circuitry 114 can execute instructions 118 to determine a distance between the observed distribution 124 and distributions 128 from fingerprint 600. The distribution of the distributions 128 having the smallest distance may be identified as matching the observed distribution 124. As another example, the distribution of the distributions 128 having the smallest distance less than a threshold value may be identified as matching the observed distribution 124.

Processing circuitry 114, in executing instructions 118 can be arranged to generate fingerprints (e.g., fingerprint 600, or the like). For example, processing circuitry 114 can execute instructions 118 to initialize generating a number of fingerprints (e.g., fingerprint 600, etc.) and can cycle through each ECU to observe voltages and generate unique distributions (e.g., distributions 128) and insert the distributions 128 along with an ECU identifier (e.g., ECU IDs 126) into the fingerprint.

Processing circuitry 114 can include any of a variety of processors, such as, for example, commercial central processing units, application specific integrated circuits, or the like. Processing circuitry 114 can be a microprocessor or a commercial processor and can include one or multiple processing core(s) and can also include cache.

Observation circuitry 116 can include circuitry such as, analog to digital converters, voltage measurement circuitry, voltage waveform observation circuitry (e.g., oscilloscope circuitry, or the like) arranged to observe voltage transitions.

Memory 112 can be based on any of a wide variety of information storage technologies. For example, memory 112 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 112 can include storage devices.

Figure 1B:
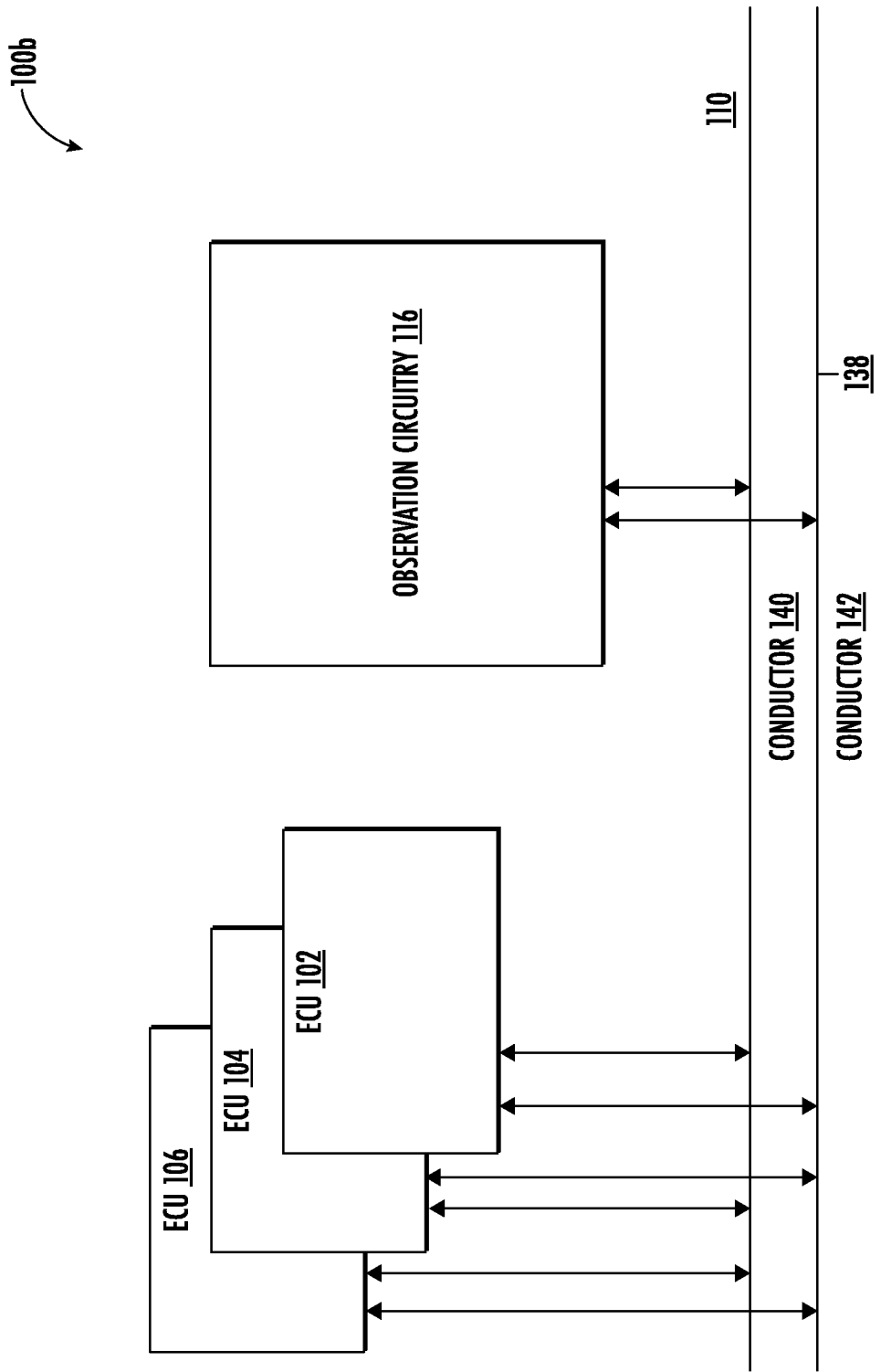
FIG. 1B illustrates a system 100 in accordance with one embodiment.

FIG. 1B illustrates system 100, which can be system 100 of FIG. 1A in alternate detail. As depicted, system 100 includes ECU 102, ECU 104, ECU 106 and observation circuitry 116. Further, as described herein, communication bus 110 can comprise a pair of conductors, such as conductor 140 and conductor 142. During operation, ECUs (e.g., ECU 102, ECU 104, ECU 106, or the like) can communicate signals via conductor 140 and conductor 142 and observation circuitry 116 can observe analog voltages from conductor 140 and conductor 142 at point 138. As will be described in greater detail below, densities 122 and observed distribution 124 for the analog voltages represented on both conductors (either individually or combined) of communication bus 110 can be generated.

Figure 2:
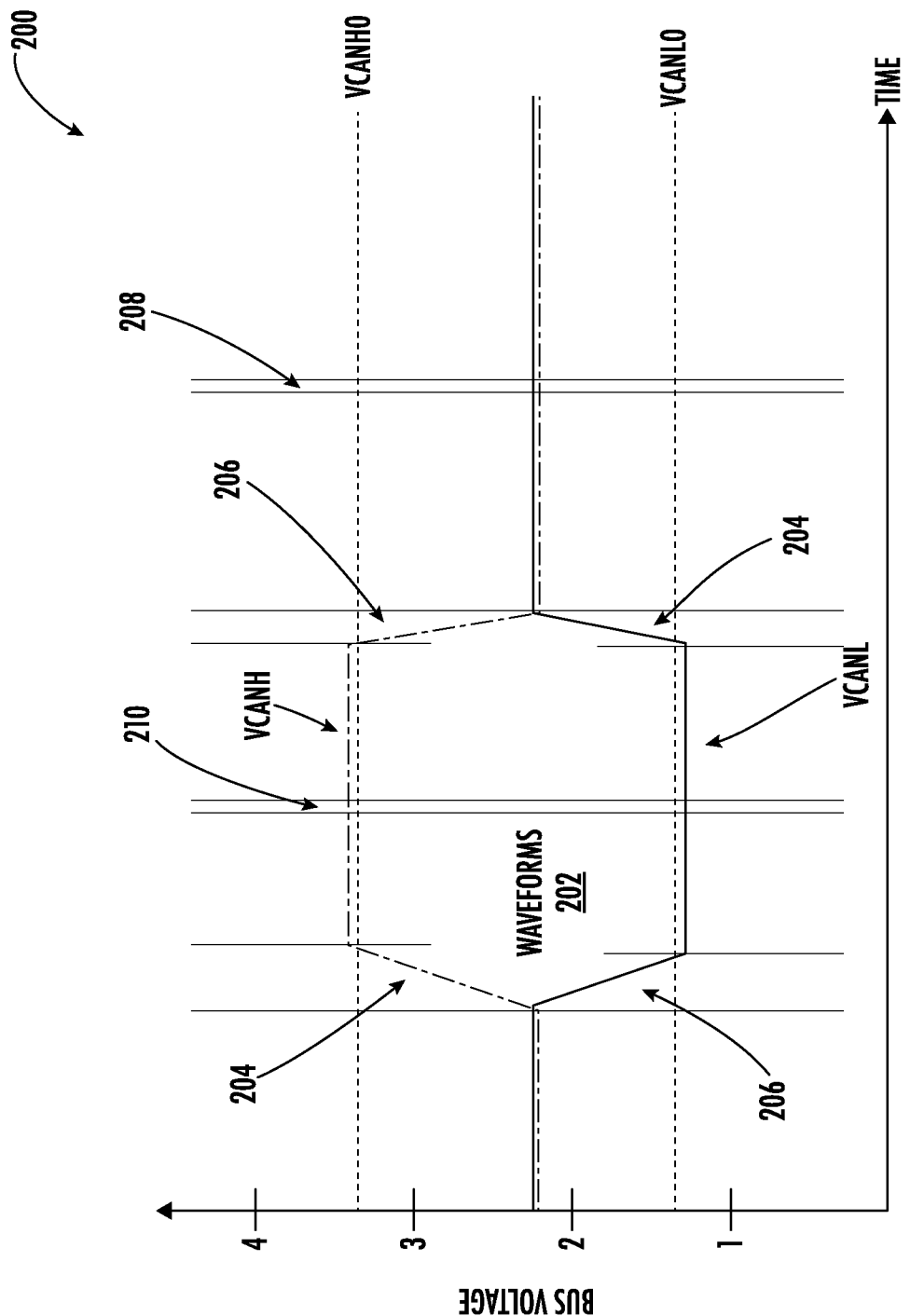
FIG. 2 illustrates a graph 200 in accordance with one embodiment.

As a specific example, communication bus 110 can be an IVN comprising a CANH conductor (e.g., conductor 140)

and a CANL conductor (e.g., conductor 142). Accordingly, FIG. 2 illustrates graph 200, showing example waveforms 202 undergoing voltage transitions. Although the present disclosure can be implemented for IVNs (e.g., the CAN bus, or the like) and the waveforms 202 are described with reference to the CAN bus, examples are not limited in this regard. FIG. 2 depicts nominal recessive and dominant bus voltages for a CAN bus. The CAN bus is comprised of two conductors, as such two waveforms 202 are depicted.

When an ECU (e.g., ECU 102, ECU 104, ECU 106, or the like) sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5 volts (V), while the VCANL0 may be about 1.5V. It is noted, that the term "about" may mean within a threshold value (e.g., as specified by the CAN standard, such as, CAN Specification version 2.0 promulgated by Bosch GmbH) and can be dependent upon the bus standard, which may dictate the tolerance. In the recessive state, either the CAN bus (e.g., communication bus 110) is idle or an ECU is transmitting a logic 1. In the dominant state, at least one ECU is transmitting a logic 0. Thus, each waveform on the CAN bus can go through a number of voltage transitions.

These voltage transitions are measured as a voltage over time and correspond to a portion of the overall voltage waveform. In particular, waveforms 202 can have a rising edge transition 204 or a falling edge transition 206. Additionally, waveforms 202 can have a steady state transition 208 and a steady state transition 210. That is, waveforms 202 can have a steady state transition 210 for both the recessive state as well as a steady state transition 208 for the dominant state. To send a message (e.g., message 130, message 132, message 134, message 136, or the like) on the CAN bus, an ECU must cause a number of voltage transitions (e.g., rising edge transition 204, falling edge transition 206, steady state transition 208, and/or steady state transition 210) on the CAN bus to communicate bits indicating the contents of the message. Accordingly, during operation, analog voltage waveforms corresponding to messages (e.g., message 130, message 132, message 134, etc.) can be observed on conductor(s) of communication bus 110.

Figure 3A:
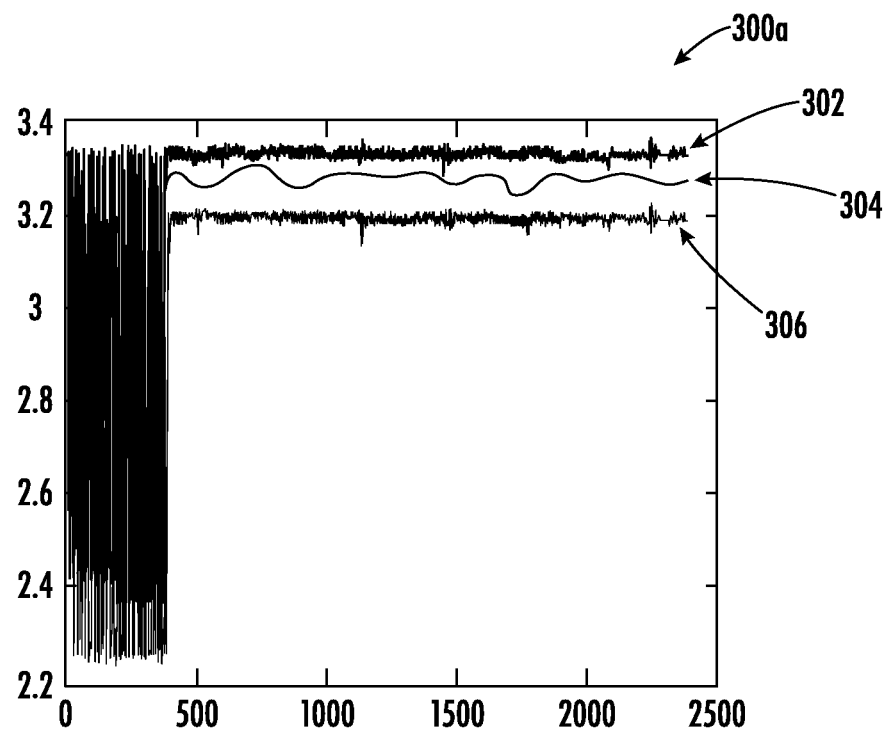
FIG. 3A illustrates a plot 300a in accordance with one embodiment.

FIG. 3A illustrates a plot 300a showing analog voltage signals (e.g., raw analog voltages 120, or the like) observed on a communication bus. In particular, plot 300a illustrates analog voltage waveforms corresponding to multiple ECUs observed on a communication bus. For example, voltage waveform 302, voltage waveform 304 and voltage waveform 306 are identified. It is to be appreciated that each ECU (e.g., ECU 102, ECU 104, ECU 106, etc.) produces unique voltage waveforms. The uniqueness in the voltage waveforms can be attributed to discrete component tolerances, timing differenced due to unsynchronized clocks, losses due to conductor length, etc.

Figure 3B:
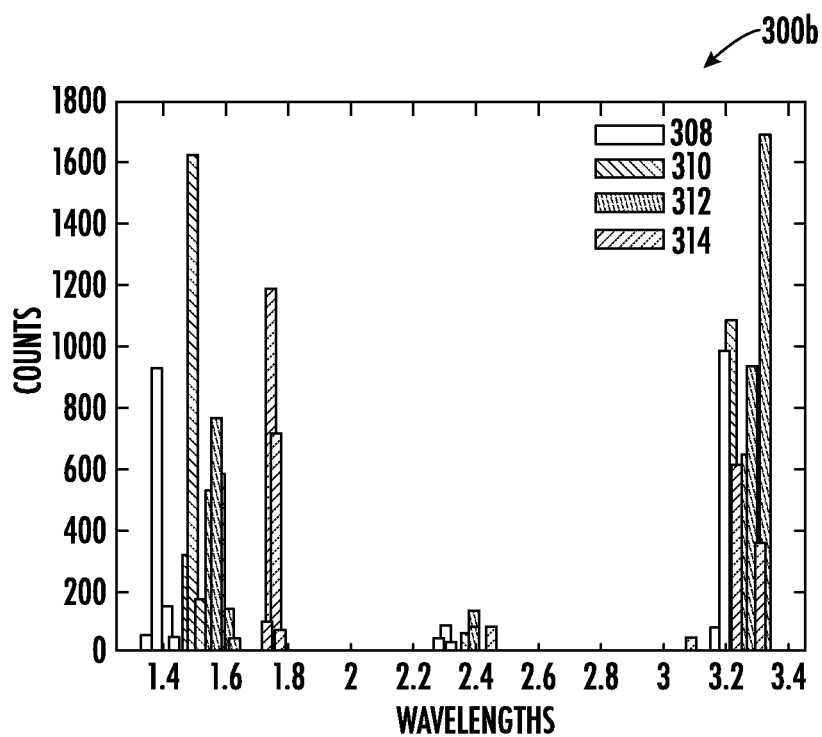
FIG. 3B illustrates a plot 300b in accordance with one embodiment.

FIG. 3B illustrates a plot 300b depicting histograms generated from the voltage waveforms depicted in plot 300a of FIG. 3A. In particular, plot 300b depicts histograms associated with a number of ECUs. Specifically, histograms for ECU 308, ECU 310, ECU 312, and ECU 314. As can be seen from this figure, histograms for the different ECUs (e.g., ECU 308, ECU 310, ECU 312, and ECU 314) are uniquely distributed across voltages. Said differently, histograms for the different ECUs form clusters that can be separated.

Figure 3C:
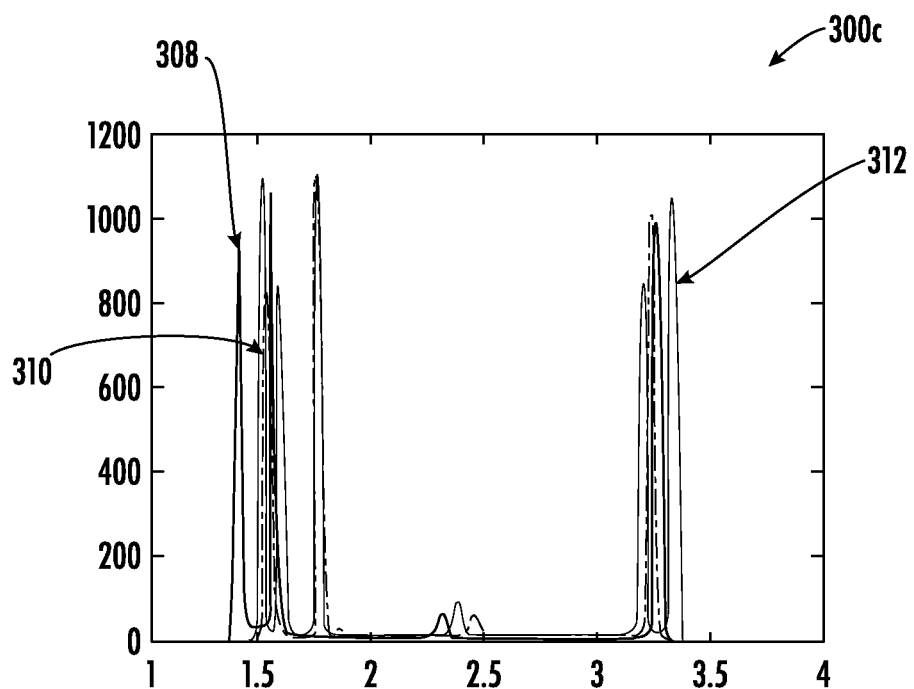
FIG. 3C illustrates a plot 300c in accordance with one embodiment.

FIG. 3C depicts a plot 300c illustrating PDFs (e.g., densities 122, or the like) generated from the histograms of plot 300b of FIG. 3B. In particular, plot 300c depicts PDFs for a number of ECUs. Specifically, PDFs for ECU 308, ECU 310 and ECU 312 are identified. With some examples, the present disclosure provides that densities 122, or the like, can be generated by fitting the histograms as the sum of kernels. For example, equation 1 illustrated below can be used to generate densities 122 from raw analog voltages 120.

$$f(x) = \frac{1}{nh}\sum_{k=1}^{n} e^{\frac{1}{2}(\frac{x}{h})^2} \qquad \text{Equation 1}$$

As noted above, raw analog voltages 120 can correspond to multiple conductors (e.g., CANH and CANL from an CAN bus IVN, or the like). In some examples, PDFs can be generated from voltage waveforms on both conductors. Specifically, a vector can be generated from both voltage waveforms and the histograms and subsequent PDF generated from the vector.

Figure 3D:
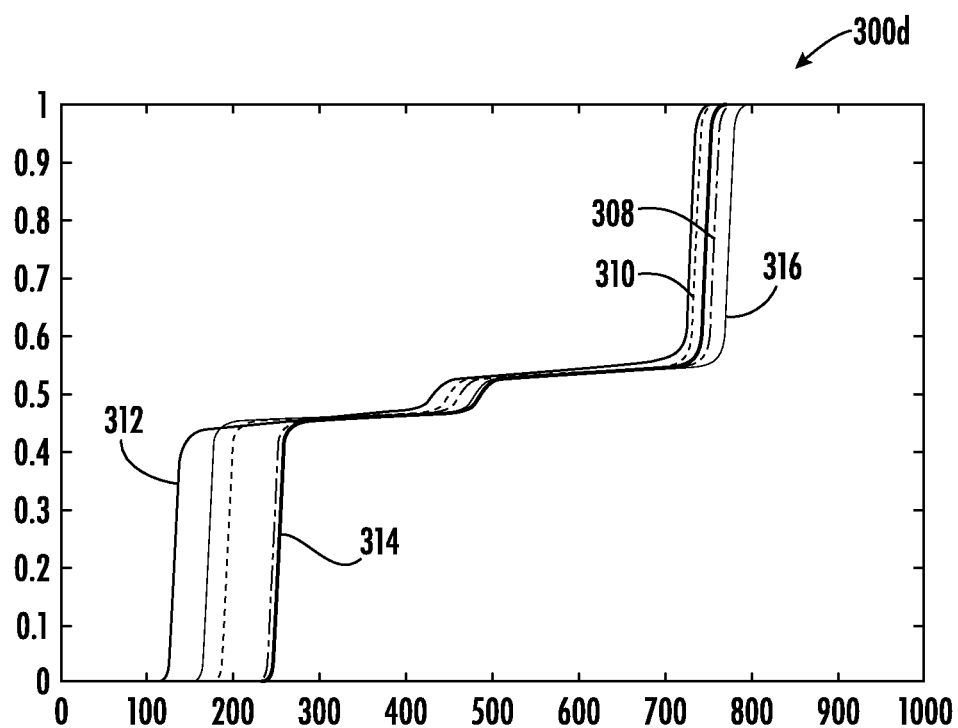
FIG. 3D illustrates a plot 300d in accordance with one embodiment.

FIG. 3D depicts a plot 300c illustrating CDFs (e.g., observed distribution 124, or the like) generated from the PDFs of plot 300c of FIG. 3C. In particular, plot 300d depicts CDFs for a number of ECUs. Specifically, CDFs for ECU 308, ECU 310, ECU 312, ECU 314, and ECU 316 are identified. With some examples, the present disclosure provides that distributions (e.g., observed distribution 124, or the like) can be generated from the PDF (e.g., densities 122). For example, equation 2 illustrated below can be used to generate observed distribution 124 from densities 122.

$$F(x) = \int_{-\infty}^{x} f(t)dt \qquad \text{Equation 2}$$

An empirical CDF can be generated for upcoming data based on Equation 3 detailed below.

$$\hat{F}_n(t) = \frac{\text{number of elements in the sample} \leq t}{n} = \frac{1}{n}\sum_{i=1}^{n} 1_{X_i \leq t1} \qquad \text{Equation 3}$$

Figure 4:
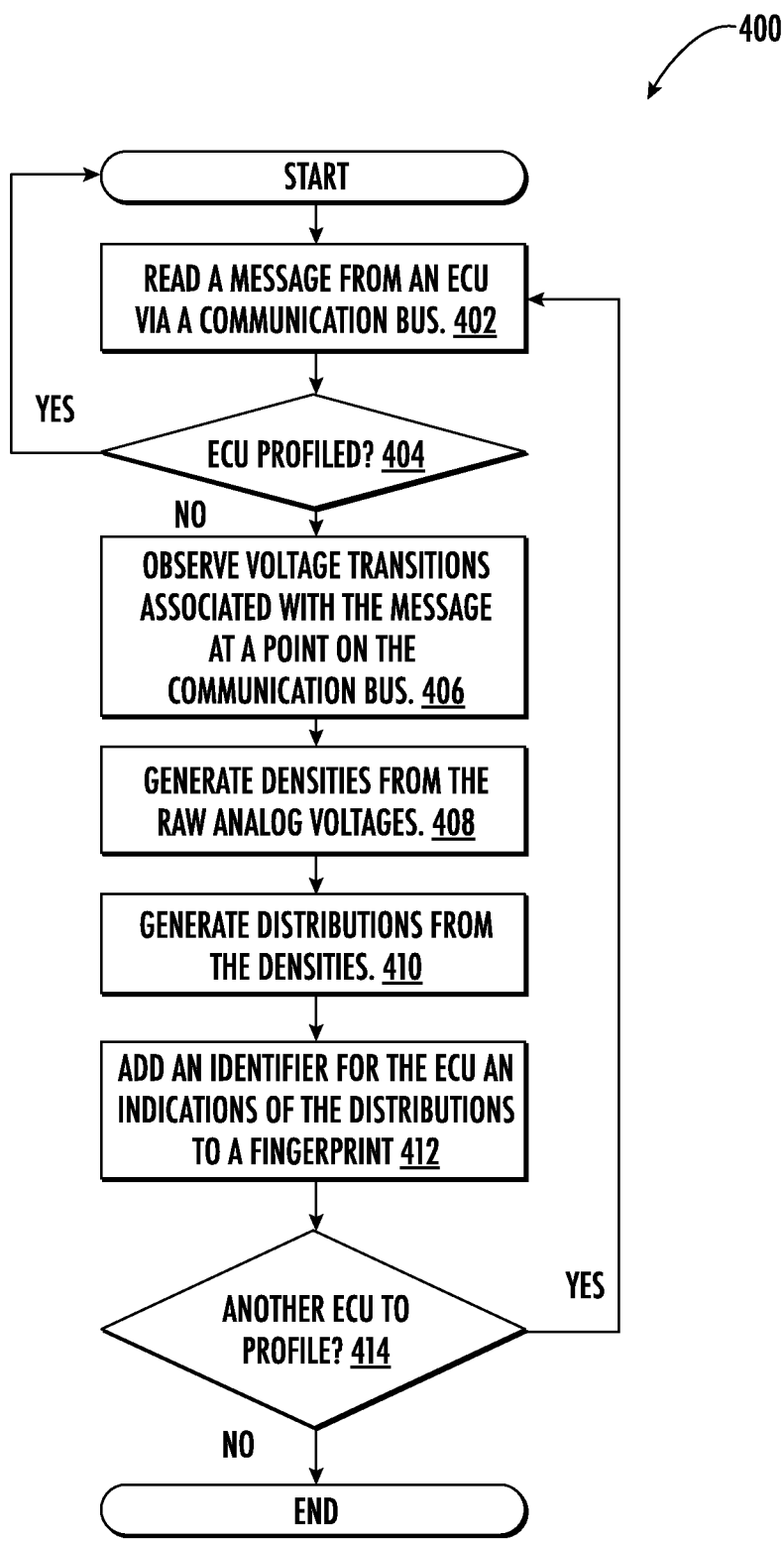
FIG. 4 illustrates a logic flow 400 in accordance with one embodiment.

FIG. 4 depicts a logic flow 400. Logic flow 400 can be implemented by an intrusion detection system (IDS), such as ECU identification device 108, to profile ECUs (or generate fingerprints for ECUs). The logic flows described herein, including logic flow 400 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 400 may begin at block 402. At block 402 "read a message from an ECU via a communication bus" processing circuitry can receive a message from an ECU. For example, processing circuitry 114 of ECU identification device 108 can receive a message (e.g., message 130, message 132, message 134, message 136, etc.) from an ECU (e.g., ECU 102, ECU 104, ECU 106, etc.) via communication bus 110. Particularly, processing circuitry 114 in executing instructions 118 can read a message, sent by an ECU, from communication bus 110.

Continuing to decision block 404 "ECU profiled?" processing circuitry can determine whether the ECU associated with the message read at block 402 has been profiled. For example, processing circuitry 114, in executing instructions 118, can determine whether the ECU associated with the message read at block 402 has been profiled, or said differently, has been fingerprinted. From decision block 404, logic flow 400 can return to block 402 or can continue to block 406. In particular, logic flow 400 can return to block 402 based on a determination at decision block 404 that the ECU has been profiled while logic flow 400 can continue to block 406 based on a determination at decision block 404 that the ECU has not been profiled.

At block 406 "observe voltage signals associated with the message at a point on the communication bus" processing circuitry can observe voltage transitions associated with the message at a point on the communication bus. For example, observation circuitry 116 of ECU identification device 108 can observe the communication bus 110 and particularly the voltage transitions on the communication bus 110 resulting from the ECU transmitting the message. More specifically, observation circuitry 116 can observe voltage transitions at point 138 of communication bus 110. The observed voltage transitions can be stored as raw analog voltages 120. Said differently, at block 406 observation circuitry 116 can capture or observe voltage signals (e.g., waveforms, or the like) on communication bus 110 and store indications of the captured or observed voltage signals as raw analog voltages 120.

Continuing to block 408 "generate densities from the raw analog voltages" processing circuitry can generate densities from the raw analog voltages. More specifically, processing circuitry 114 in executing instructions 118 can generate densities 122 (e.g., PDFs, or the like) as described herein.

Continuing to block 410 "generate distributions from the densities" processing circuitry can generate distributions from the densities generated at block 408. More specifically, processing circuitry 114 in executing instructions 118 can generate observed distribution 124 (e.g., CDFs, or the like) as described herein.

Continuing to block 412 "add an identifier for the ECU and indications of the distributions to a fingerprint" processing circuitry can add indications of the generated distributions and an identifier for the ECU associated with the distribution to a fingerprint. For example, processing circuitry 114 of ECU identification device 108 can add distributions 128 and ECU IDs 126 to fingerprint 600. Particularly, processing circuitry 114 in executing instructions 118 can add indications of distributions 128 (e.g., corresponding to CDFs generated based on the PDFs, which themselves are generated from the raw analog voltages 120) and an ECU IDs 126 (e.g., an identifier for the ECU sending the message) to the fingerprint 600. It is noted, fingerprint 600 can have a number of entries for ECU IDs 126, and thus a number of entries for distributions 128.

Continuing to decision block 414 "another ECU to profile?" processing circuitry can determine whether to there are additional ECUs to profile. For example, processing circuitry 114 can determine whether there are more ECUs to profile. With some examples, fingerprint 600 can be pre-populated with ECU IDs 126 (e.g., by a manufacturer, by a platform installer, by a technician, or the like). Thus, processing circuitry 114 in executing instructions 118 can determine whether any ECU IDs 126 in fingerprint 600 are left to profile. From decision block 414, logic flow 400 can return to block 402 or can end. In particular, logic flow 400 can return to block 402 based on a determination at decision block 414 that there are more ECUs to profile while logic flow 400 can end based on a determination at decision block 414 that there are not any more ECUs to profile.

Figure 5:
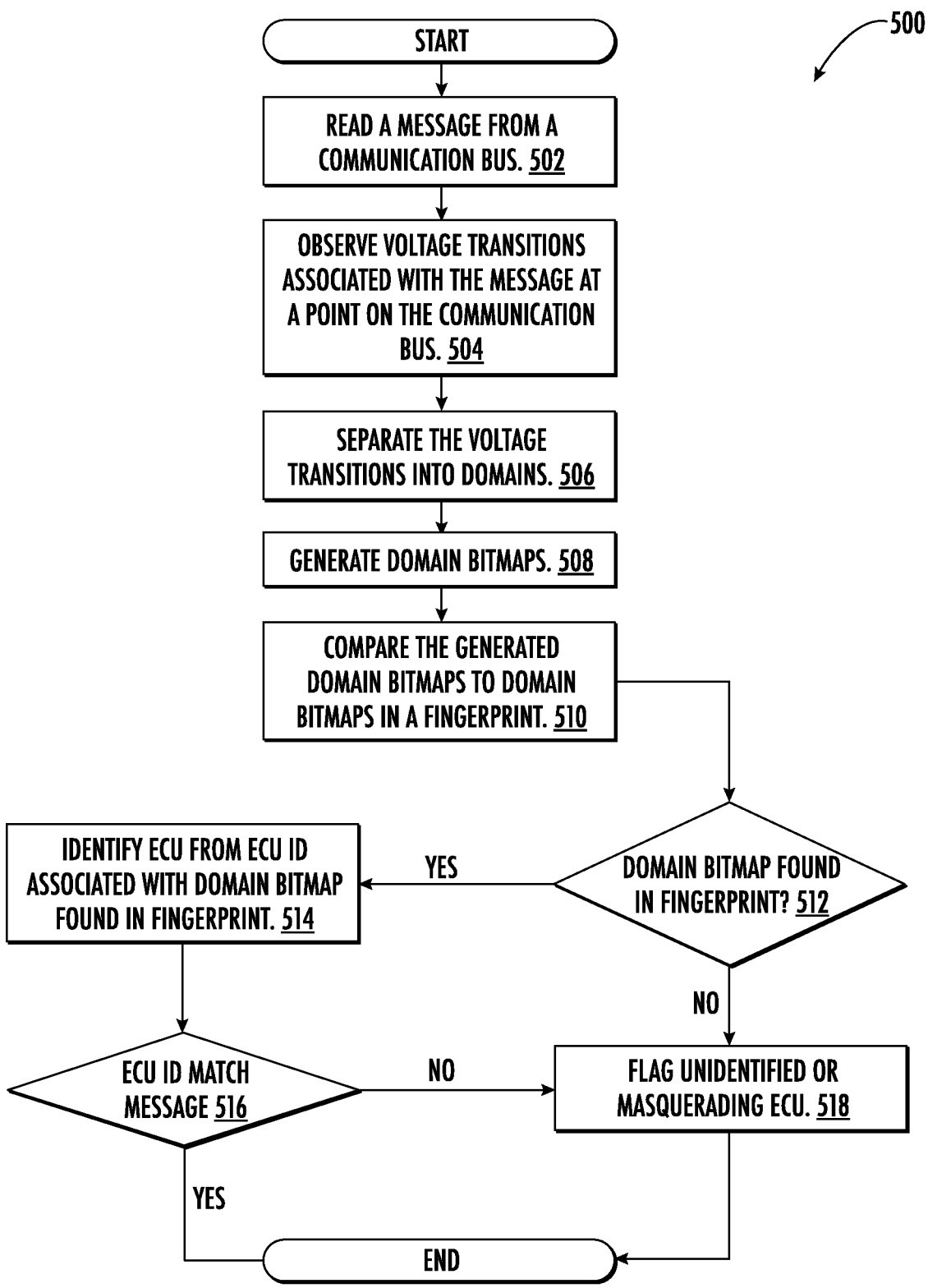
FIG. 5 illustrates a logic flow 500 in accordance with one embodiment.

FIG. 5 depicts a logic flow 500. Logic flow 500 can be implemented by an intrusion detection system (IDS), such as ECU identification device 108, to identify ECUs. Logic flow 500 may begin at block 502. At block 502 "read a message from a communication bus" processing circuitry can read a message from a communication bus. For example, processing circuitry 114 of ECU identification device 108 can read a message from communication bus. Particularly, processing circuitry 114 in executing instructions 118 can read a message (e.g., message 130, message 132, message 134, message 136, or the like) transmitted by an ECU onto communication bus 110.

Continuing to block 504 "observe voltage signals associated with the message at a point on the communication bus" processing circuitry can observe voltage transitions associated with the message at a point on the communication bus. For example, observation circuitry 116 of ECU identification device 108 can observe the communication bus 110 and particularly the voltage transitions on the communication bus 110 resulting from the ECU transmitting the message. More specifically, observation circuitry 116 can observe voltage transitions at point 138 of communication bus 110. The observed voltage transitions can be stored as raw analog voltages 120. Said differently, at block 406 observation circuitry 116 can capture or observe voltage signals (e.g., waveforms, or the like) on communication bus 110 and store indications of the captured or observed voltage signals as raw analog voltages 120.

Continuing to block 506 "generate densities from the raw analog voltages" processing circuitry can generate densities from the raw analog voltages. More specifically, processing circuitry 114 in executing instructions 118 can generate densities 122 (e.g., PDFs, or the like) as described herein.

Continuing to block 508 "generate distributions from the densities" processing circuitry can generate distributions from the densities generated at block 408. More specifically, processing circuitry 114 in executing instructions 118 can generate observed distribution 124 (e.g., CDFs, or the like) as described herein.

Continuing to block 510 "compare the generated distribution to distributions in a fingerprint" processing circuitry can compare the generated distribution (e.g., CDF) to distributions (e.g., CDFs) in a fingerprint. For example, processing circuitry 114 of ECU identification device 108 can compare the generated distribution to distributions in a fingerprint, for example, by using a minimum mean squared error (MMSE) calculation to determine similarity between the generated distribution and the distributions in the fingerprint. Particularly, processing circuitry 114 in executing instructions 118 can compare observed distribution 124 (e.g., the distribution generated at block 508) to distributions 128 in fingerprint 600.

Continuing to decision block 512 "distribution found in fingerprint?" processing circuitry can determine whether the distribution is found in the fingerprint. For example, processing circuitry 114 in executing instructions 118 can determine whether the distribution generated at block 508 are found in fingerprint 600 (e.g., based on comparing the distributions at block 510, or the like). From decision block 512, logic flow 500 can continue to either block 514 or block 518. In particular, logic flow 500 can continue from decision block 512 to block 514 based on a determination at decision block 512 that the distribution is found in the fingerprint while logic flow 500 can continue from decision block 512 to block 518 based on a determination at decision block 512 that the distribution is not found in the fingerprint.

At block 514 "identify ECU from ECU ID associated with the distribution in the fingerprint" processing circuitry can identify the ECU transmitting the message read at block 502 based on the EDU ID associated with the distribution in the fingerprint. For example, processing circuitry 114 of ECU identification device 108 can identify the ECU that transmitted the message read at block 502 based on the ECU ID associated with the distribution in the fingerprint that matches the observed distribution. Particularly, processing circuitry 114 in executing instructions 118 can identify the ECU (e.g., ECU 102, ECU 104, ECU 106, etc.) that transmitted the message (e.g., message 130, message 132, message 134, message 136, etc.) read at block 502 from the ECU IDs 126 associated with the distributions 128 in the fingerprint 600 that matches the distribution generated at block 508 (e.g., densities 122, or the like).

Continuing to decision block 516 "ECU ID match message?" processing circuitry can identify whether the fingerprinted ECU matches the ECU identified by the message. Said differently, processing circuitry can verify the correctness of the ECU identifier in the message based on the ECU IDs 126 from the fingerprint 600. For example, processing circuitry 114 of ECU identification device 108 can determine whether the ECU ID identified in the fingerprint for the message (e.g., based on a comparison of the distributions) matches the ECU ID with which the message itself indicates sent the message. From decision block 516, logic flow 500 can continue to either block 518 or can end. In particular, logic flow 500 can continue from decision block 516 to block 518 based on a determination at decision block 516 that the ECU ID from the fingerprint does not match the ECU ID from the message while logic flow 500 can end based on a determination at decision block 516 that the ECU ID from the fingerprint does match the ECU ID from the message.

At block 518 "flag unidentified or masquerading ECU" processing circuitry can flag an unidentified ECU or a masquerading ECU. For example, processing circuitry 114 of ECU identification device 108 can flag (e.g., send a notification to a user, send a notification to a cloud monitoring service, send a notification to a management ECU, or the like) an unidentified ECU or a known ECU masquerading as another ECU. Particularly, processing circuitry 114 in executing instructions 118 can flag the potential unknown or masquerading ECU.

Figure 6:
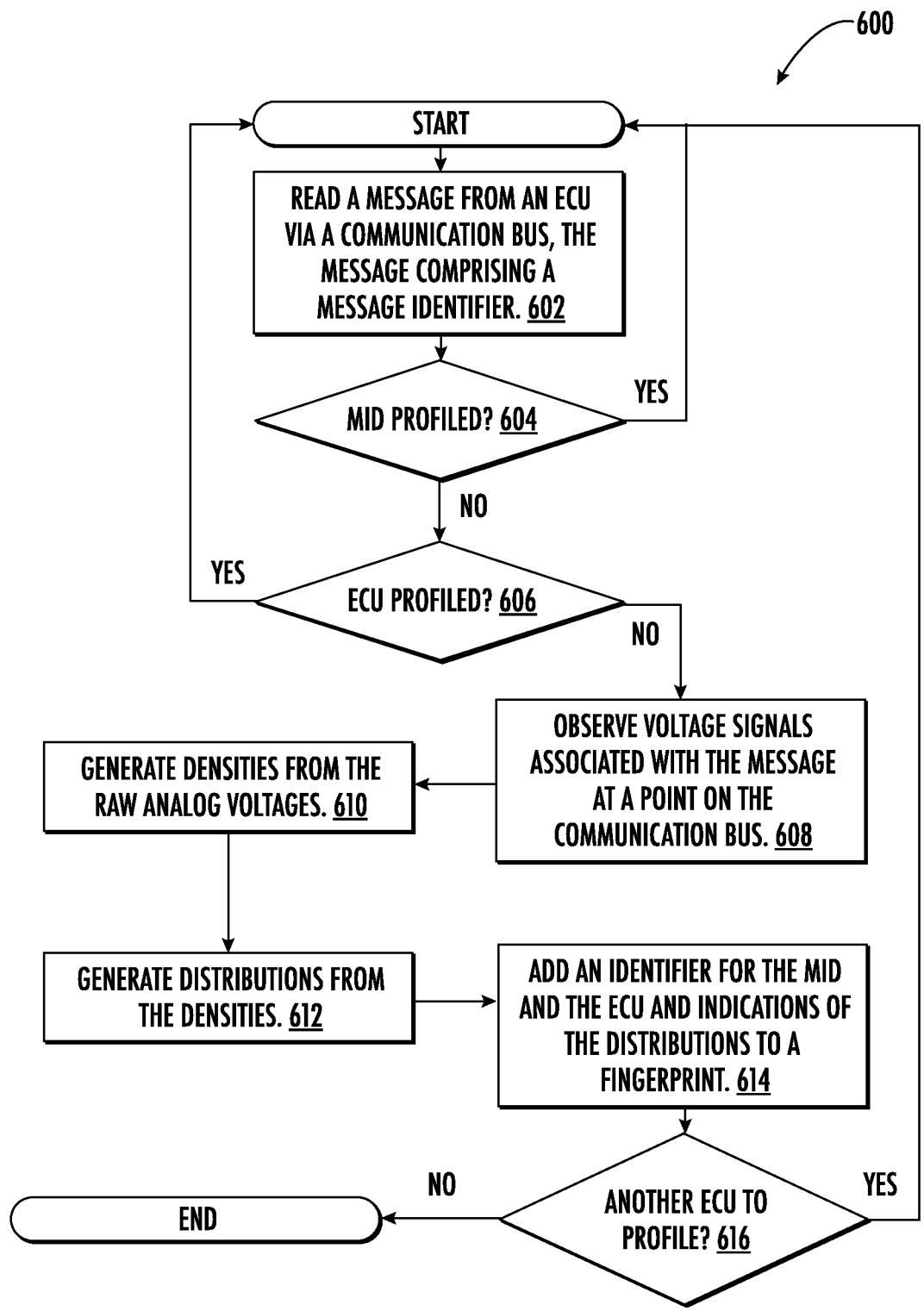
FIG. 6 illustrates a logic flow 600 in accordance with one embodiment.

FIG. 6 depicts a logic flow 600. Logic flow 600 can be implemented by an intrusion detection system (IDS), such as ECU identification device 108, to profile ECUs (or generate fingerprints for ECUs). The logic flows described herein, including logic flow 600 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 600 may begin at block 602. At block 602 "read a message from an ECU via a communication bus, the message comprising a message identifier" processing circuitry can receive a message from an ECU. It is to be appreciated, that is some examples, such as, an IVN (e.g., CAN bus, or the like) the IVN may not include device addresses. As such, the messages can include a message identification (MID) with which receivers can determine whether the message is relevant or not. Returning to block 602, processing circuitry 114 of ECU identification device 108 can receive a message (e.g., message 130, message 132, message 134, message 136, etc.) from an ECU (e.g., ECU 102, ECU 104, ECU 106, etc.) via communication bus 110. Particularly, processing circuitry 114 in executing instructions 118 can read a message, sent by an ECU, from communication bus 110.

Continuing to decision block 604 "MID profiled" processing circuitry can determine whether the MID associated with the message read at block 602 has been profiled. For example, processing circuitry 114, in executing instructions 118, can determine whether the MID associated with the message read at block 602 has been profiled, or said differently, has been fingerprinted. From decision block 604, logic flow 600 can return to block 602 or can continue to decision block 606. In particular, logic flow 600 can return to block 602 based on a determination at decision block 604 that the MID has been profiled while logic flow 600 can continue to decision block 606 based on a determination at decision block 604 that the MID has not been profiled.

Continuing to decision block 606 "ECU profiled?" processing circuitry can determine whether the ECU associated with the message read at block 602 has been profiled. For example, processing circuitry 114, in executing instructions 118, can determine whether the ECU associated with the message read at block 602 has been profiled, or said differently, has been fingerprinted. From decision block 606, logic flow 600 can return to block 602 or can continue to block 608. In particular, logic flow 600 can return to block 602 based on a determination at decision block 606 that the ECU has been profiled while logic flow 600 can continue to block 608 based on a determination at decision block 606 that the ECU has not been profiled.

At block 608 "observe voltage signals associated with the message at a point on the communication bus" processing circuitry can observe voltage transitions associated with the message at a point on the communication bus. For example, observation circuitry 116 of ECU identification device 108 can observe the communication bus 110 and particularly the voltage transitions on the communication bus 110 resulting from the ECU transmitting the message. More specifically, observation circuitry 116 can observe voltage transitions at point 138 of communication bus 110. The observed voltage transitions can be stored as raw analog voltages 120. Said differently, at block 608 observation circuitry 116 can capture or observe voltage signals (e.g., waveforms, or the like) on communication bus 110 and store indications of the captured or observed voltage signals as raw analog voltages 120.

Continuing to block 610 "generate densities from the raw analog voltages" processing circuitry can generate densities from the raw analog voltages. More specifically, processing circuitry 114 in executing instructions 118 can generate densities 122 (e.g., PDFs, or the like) as described herein.

Continuing to block 612 "generate distributions from the densities" processing circuitry can generate distributions from the densities generated at block 610. More specifically, processing circuitry 114 in executing instructions 118 can generate observed distribution 124 (e.g., CDFs, or the like) as described herein.

Continuing to block 614 "add an identifier for the MID and the ECU and indications of the distributions to a fingerprint" processing circuitry can add indications of the generated distributions and an identifier for the MID and the ECU associated with the distribution to a fingerprint. For example, processing circuitry 114 of ECU identification device 108 can add distributions 128, ECU IDs 126, as well as MID indication (not shown) to fingerprint 700. Particularly, processing circuitry 114 in executing instructions 118 can add indications of distributions 128 (e.g., corresponding to CDFs generated based on the PDFs, which themselves are generated from the raw analog voltages 120), an ECU IDs 126 (e.g., an identifier for the ECU sending the message), and an MID indication (e.g., an indication of the message ID associated with the message) to the fingerprint 700. It is noted, fingerprint 700 can have a number of entries for ECU IDs 126 and/or MIDs, and thus a number of entries for distributions 128.

Continuing to decision block 616 "another ECU to profile?" processing circuitry can determine whether to there are additional ECUs to profile. For example, processing circuitry 114 can determine whether there are more ECUs to profile. With some examples, fingerprint 700 can be pre-populated with ECU IDs 126 (e.g., by a manufacturer, by a platform installer, by a technician, or the like). Thus, processing circuitry 114 in executing instructions 118 can determine whether any ECU IDs 126 in fingerprint 700 are left to profile. From decision block 616, logic flow 600 can return to block 602 or can end. In particular, logic flow 600 can return to block 602 based on a determination at decision block 616 that there are more ECUs to profile while logic flow 600 can end based on a determination at decision block 616 that there are not any more ECUs to profile.

Figure 7:
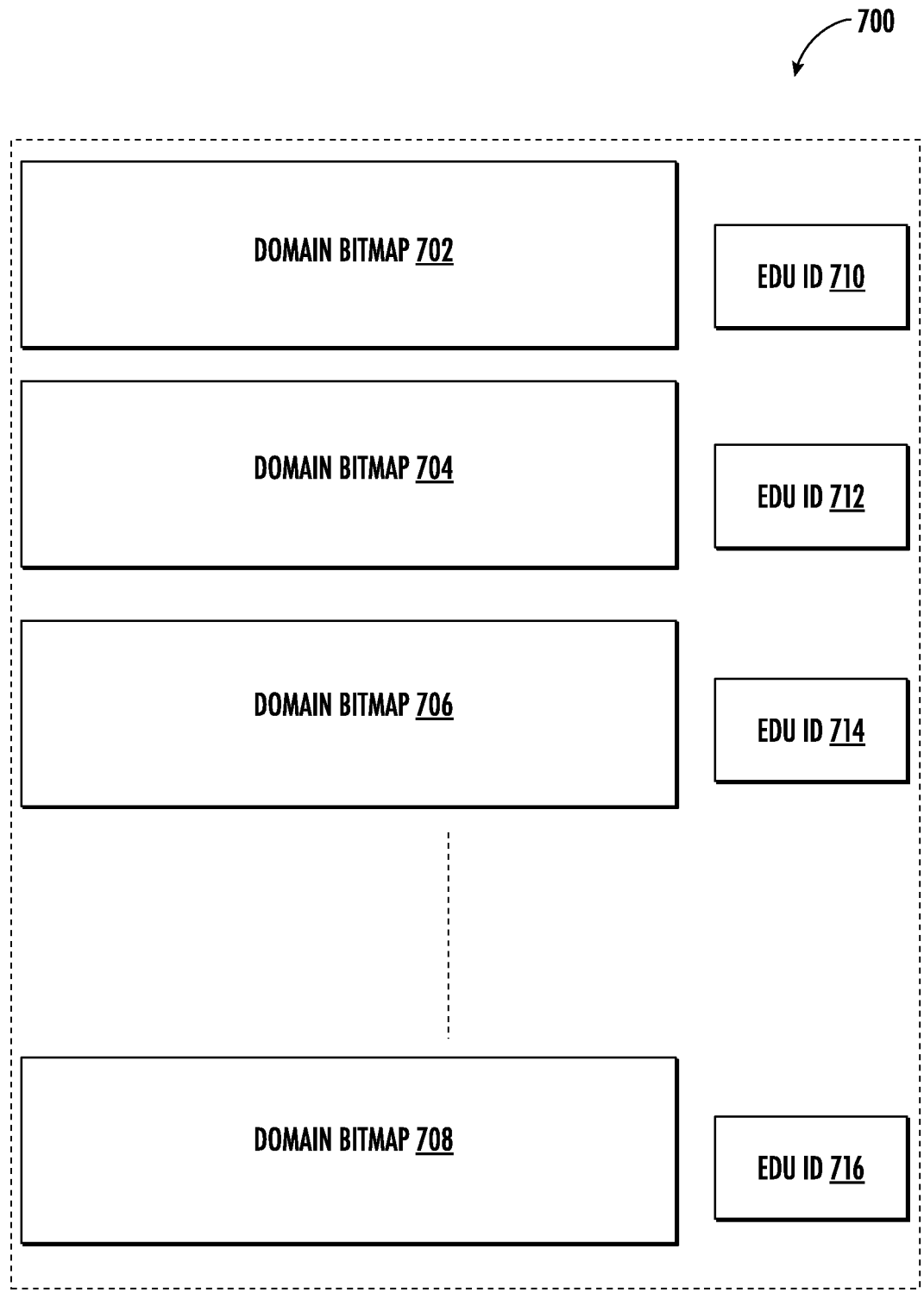
FIG. 7 illustrates a fingerprint 700 in accordance with one embodiment.

FIG. 7 illustrates an example fingerprint 700 including profiles for multiple ECUs. Fingerprint 700 can be an example of a fingerprint from system 100 of FIG. 1A. In general, fingerprint 700 includes an entry for each ECU in the system, where each entry includes an ECU ID and an associated distributions. In particular, this figure illustrates EDU ID 710, EDU ID 712, EDU ID 714, and EDU ID 716 with associated distributions. Specifically, EDU ID 710 is associated with distribution 702, EDU ID 712 is associated with Distribution 704, EDU ID 714 is associated with distribution 706, and EDU ID 716 is associated with distribution 708. Fingerprint 700 can be implemented in a database, in a table, or in another information element or data structure.

Figure 8:
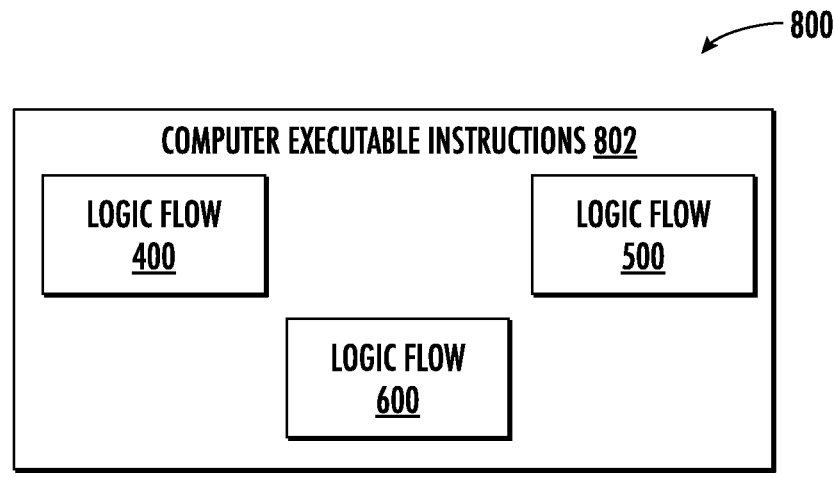
FIG. 8 illustrates a storage device 800 in accordance with one embodiment.

FIG. 8 illustrates an example of a storage device 800. Storage device 800 may comprise an article of manufacture, such as, any non-transitory computer readable medium or machine readable medium, such as an optical, magnetic or semiconductor storage. Storage device 800 may store various types of computer executable instructions 802, such as instructions to implement logic flow 400, logic flow 500, and/or logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
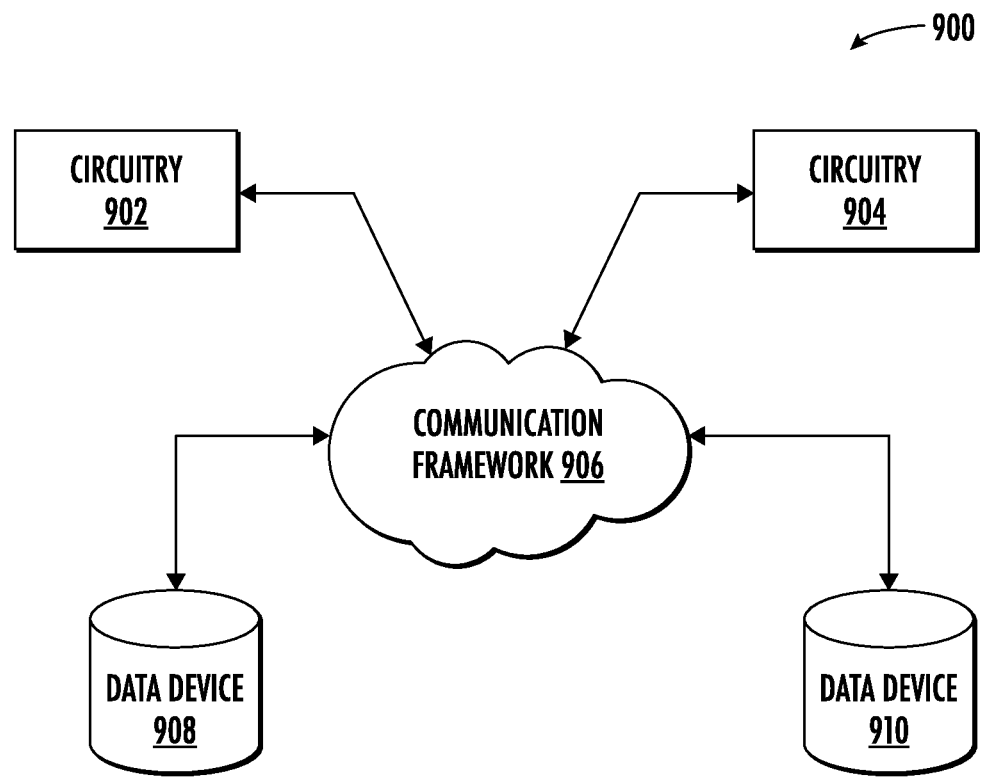
FIG. 9 illustrates an in-vehicle communication architecture 800 in accordance with one embodiment.

FIG. 9 illustrates an in-vehicle communication architecture 900 according to one or more embodiments of the disclosure. For example, one or more vehicular devices, components, or circuits, such as circuitry 902 and/or circuitry 904, may communicate with each other via a communications communication framework 906, which may be an in-vehicle network, such as a CAN bus, implemented to facilitate fingerprinting of ECUs as described above.

The in-vehicle communication architecture 900 includes various common communications elements, such as a transmitter, receiver, transceiver, and so forth. The embodiments, however, are not limited to implementation by the in-vehicle communication architecture 900. As shown in this figure, the vehicular circuitry 902 and circuitry 904 may each be operatively connected to one or more respective data devices, such as, data device 908 and/or data device 910 that can be employed to store information local to the respective circuitry 902 and/or circuitry 904, such as fingerprints, distributions, densities, voltage signals, or the like. It may be understood that the circuitry 902 and circuitry 904 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 906 in a vehicle.

Further, the communication framework 906 may implement any well-known communications techniques and protocols. As described above, the communication framework 906 may be implemented as a CAN bus protocol or any other suitable in-vehicle communication protocol. The communication framework 906 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 906 may employ both wired and wireless connections.

Figure 10:
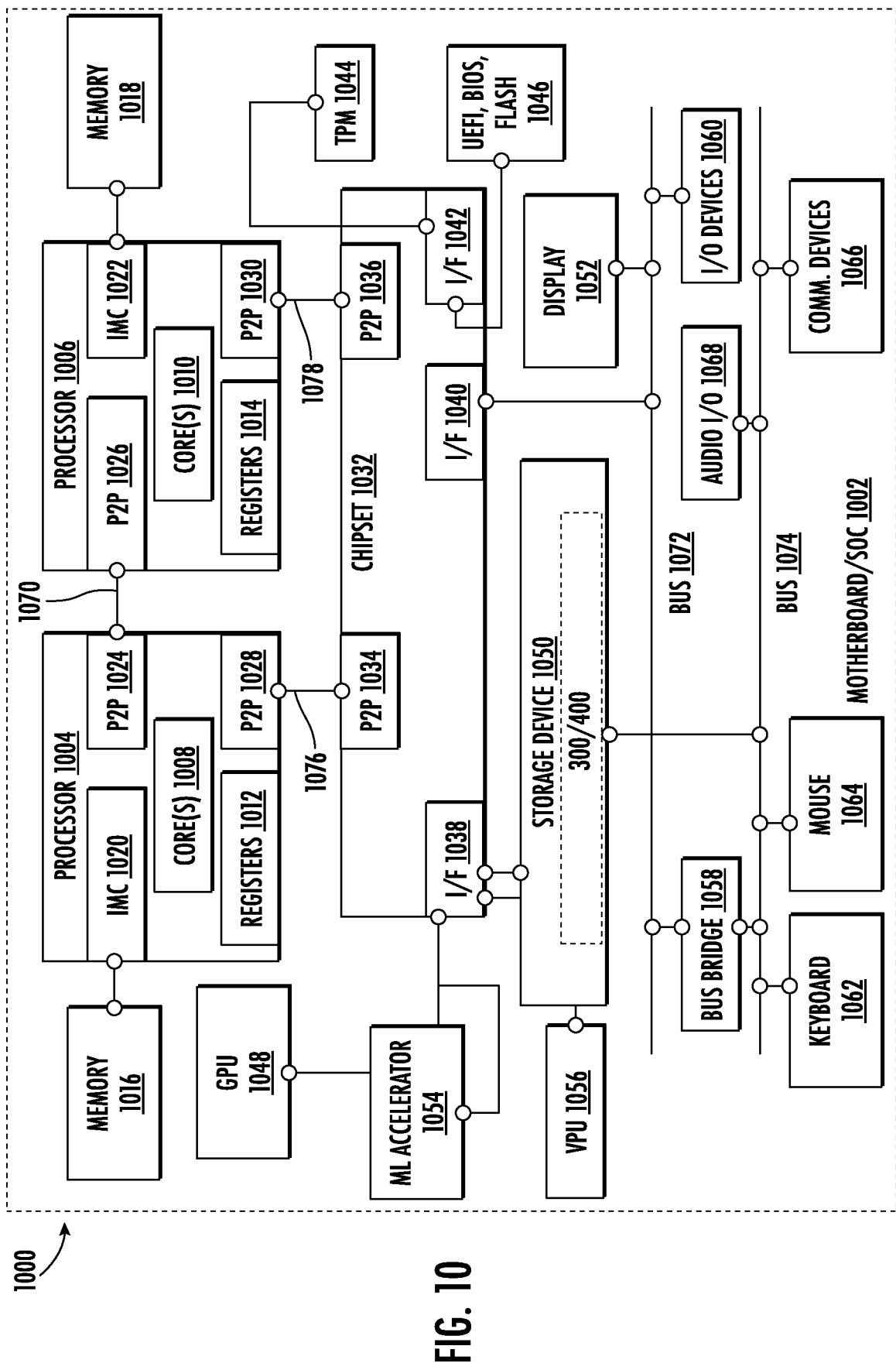
FIG. 10 illustrates an aspect of the subject matter in accordance with one embodiment.

FIG. 10 illustrates an embodiment of a system 1000. System 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores. In at least one embodiment, the computing system 1000 is representative of the components of system 100. More generally, the computing system 1000 is configured to implement all logic, systems, logic flows, methods, apparatuses, and functionality described herein with reference to FIG. 1A, FIG. 1B, FIG. 2, FIG. 3A, FIG. 3B, FIG. 3C, FIG. 3D, FIG. 4, FIG. 5, FIG. 6, FIG. 7, FIG. 8, and FIG. 9.

As used in this application, the terms "system" and "component" and "module" are intended to refer to a computer-related entity, either hardware, a combination of hardware and software, software, or software in execution, examples of which are provided by the exemplary system 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1000 comprises a motherboard or system-on-chip (SoC) 1002 for mounting platform components. Motherboard or system-on-chip (SoC) 1002 is a point-to-point (P2P) interconnect platform that includes a first processor 1004 and a second processor 1006 coupled via a point-to-point interconnect 1070 such as an Ultra Path Interconnect (UPI). In other embodiments, the system 1000 may be of another bus architecture, such as a multi-drop bus. Furthermore, each of processor 1004 and processor 1006 may be processor packages with multiple processor cores including core(s) 1008 and core(s) 1010, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1004 and chipset 1032. Some platforms may include additional components and some platforms may only include sockets to mount the processors and/or the chipset. Furthermore, some platforms may not have sockets (e.g. SoC, or the like).

The processor 1004 and processor 1006 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 1004 and/or processor 1006. Additionally, the processor 1004 need not be identical to processor 1006.

Processor 1004 includes an integrated memory controller (IMC) 1020 and point-to-point (P2P) interface 1024 and P2P interface 1028. Similarly, the processor 1006 includes an IMC 1022 as well as P2P interface 1026 and P2P interface 1030. IMC 1020 and IMC 1022 couple the processors processor 1004 and processor 1006, respectively, to respective memories (e.g., memory 1016 and memory 1018). Memory 1016 and memory 1018 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1016 and memory 1018 locally attach to the respective processors (i.e., processor 1004 and processor 1006). In other embodiments, the main memory may couple with the processors via a bus and shared memory hub.

System 1000 includes chipset 1032 coupled to processor 1004 and processor 1006. Furthermore, chipset 1032 can be coupled to storage device 1050, for example, via an interface (I/F) 1038. The I/F 1038 may be, for example, a Peripheral Component Interconnect-enhanced (PCI-e). Storage device 1050 can store instructions executable by circuitry of system 1000 (e.g., processor 1004, processor 1006, GPU 1048, ML accelerator 1054, vision processing unit 1056, or the like). For example, storage device 1050 can store instructions for logic flow 400, logic flow 500, logic flow 600, or the like.

Processor 1004 couples to a chipset 1032 via P2P interface 1028 and P2P 1034 while processor 1006 couples to a chipset 1032 via P2P interface 1030 and P2P 1036. Direct media interface (DMI) 1076 and DMI 1078 may couple the P2P interface 1028 and the P2P 1034 and the P2P interface 1030 and P2P 1036, respectively. DMI 1076 and DMI 1078 may be a high-speed interconnect that facilitates, e.g., eight Giga Transfers per second (GT/s) such as DMI 3.0. In other embodiments, the processor 1004 and processor 1006 may interconnect via a bus.

The chipset 1032 may comprise a controller hub such as a platform controller hub (PCH). The chipset 1032 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1032 may comprise more than one controller hub such as a chipset with a memory controller hub, a graphics controller hub, and an input/output (I/O) controller hub.

In the depicted example, chipset 1032 couples with a trusted platform module (TPM) 1044 and UEFI, BIOS, FLASH circuitry 1046 via I/F 1042. The TPM 1044 is a dedicated microcontroller designed to secure hardware by integrating cryptographic keys into devices. The UEFI, BIOS, FLASH circuitry 1046 may provide pre-boot code.

Furthermore, chipset 1032 includes the I/F 1038 to couple chipset 1032 with a high-performance graphics engine, such as, graphics processing circuitry or a graphics processing unit (GPU) 1048. In other embodiments, the system 1000 may include a flexible display interface (FDI) (not shown) between the processor 1004 and/or the processor 1006 and the chipset 1032. The FDI interconnects a graphics processor core in one or more of processor 1004 and/or processor 1006 with the chipset 1032. Additionally, ML accelerator 1054 and/or vision processing unit 1056 can be coupled to chipset 1032 via I/F 1038. ML accelerator 1054 can be circuitry arranged to execute ML related operations (e.g., training, inference, etc.) for ML models. Likewise, vision processing unit 1056 can be circuitry arranged to execute vision processing specific or related operations. In particular, ML accelerator 1054 and/or vision processing unit 1056 can be arranged to execute mathematical operations and/or operands useful for machine learning, neural network processing, artificial intelligence, vision processing, etc.

Various I/O devices 1060 and display 1052 couple to the bus 1072, along with a bus bridge 1058 which couples the bus 1072 to a second bus 1074 and an I/F 1040 that connects the bus 1072 with the chipset 1032. In one embodiment, the second bus 1074 may be a low pin count (LPC) bus. Various devices may couple to the second bus 1074 including, for example, a keyboard 1062, a mouse 1064 and communication devices 1066.

Furthermore, an audio I/O 1068 may couple to second bus 1074. Many of the I/O devices 1060 and communication devices 1066 may reside on the motherboard or system-on-chip (SoC) 1002 while the keyboard 1062 and the mouse 1064 may be add-on peripherals. In other embodiments, some or all the I/O devices 1060 and communication devices 1066 are add-on peripherals and do not reside on the motherboard or system-on-chip (SoC) 1002.

The components and features of the devices described above may be implemented using any combination of processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. An apparatus, comprising: processing circuitry; and memory coupled to the processing circuitry, the memory comprising instructions that when executed by the processing circuitry cause the processing circuitry to: process a voltage waveform to generate an observed distribution from the voltage waveform, determine whether the observed distribution matches a fingerprint distribution from a fingerprint, and identify an electronic control unit (ECU) associated with the fingerprint distribution based on a determination that the observed distribution matched the fingerprint distribution.

Example 2. The apparatus of example 1, the instructions when executed by the processing circuitry cause the processing circuitry to: derive a distance between the observed distribution and a plurality of fingerprint distributions from the fingerprint based on a minimum mean squared error, the plurality of fingerprint distributions comprising the fingerprint distribution; and determine whether the observed distribution matched the fingerprint distribution based on determination that the distance between the observed distribution and the fingerprint distribution is less than a threshold value.

Example 3. The apparatus of example 1, the instructions when executed by the processing circuitry cause the processing circuitry to: generate a density from the voltage waveform; and generate the observed distribution from the density.

Example 4. The apparatus of example 1, the instructions when executed by the processing circuitry cause the processing circuitry to: identify a message transmitted on a communication bus; observe voltage signals on the communication bus associated with transmission of the message; and generate the voltage waveform based on the observed voltage signals.

Example 5. The apparatus of example 4, wherein the communication bus is an in-vehicle network.

Example 6. The apparatus of example 4, comprising observation circuitry arranged to observe the voltage signals at a point on the communication bus.

Example 7. The apparatus of example 1, the instructions when executed by the processing circuitry cause the processing circuitry to: look up an ECU identification (ID) associated with the fingerprint distribution; and identify the ECU based on the ECU ID.

Example 8. The apparatus of example 1, the memory comprising the fingerprint, the fingerprint comprising a plurality of fingerprint distributions and a plurality of ECU IDs associated with the plurality of fingerprint distributions.

Example 9. The apparatus of example 1, the instructions when executed by the processing circuitry cause the processing circuitry to flag an unidentified ECU based on a determination that the observed distribution does not match the fingerprint distribution.

Example 10. The apparatus of example 1, the instructions when executed by the processing circuitry cause the processing circuitry to: determine whether an ECU ID associated with the observed distribution matches an ECU ID associated with a message associated with the voltage waveform; and flag a masquerading ECU based on a determination that the observed distribution does match the fingerprint distribution but that the ECU ID associated with the observed distribution does not match an ECU ID associated with the message.

Example 11. A system, comprising: at least one electronic control unit (ECU); and an ECU identification sub-system coupled to the at least one ECU via an in-vehicle network (IVN), the ECU identification sub-system comprising: processing circuitry; and memory coupled to the processing circuitry, the memory comprising instructions that when executed by the processing circuitry cause the processing circuitry to: process a voltage waveform to generate an observed distribution from the voltage waveform, determine whether the observed distribution matches a fingerprint distribution from a fingerprint, and identify an electronic control unit (ECU) associated with the fingerprint distribution based on a determination that the observed distribution matched the fingerprint distribution.

Example 12. The system of example 11, the instructions when executed by the processing circuitry cause the processing circuitry to: derive a distance between the observed distribution and a plurality of fingerprint distributions from the fingerprint based on a minimum mean squared error, the plurality of fingerprint distributions comprising the fingerprint distribution; and determine whether the observed distribution matched the fingerprint distribution based on determination that the distance between the observed distribution and the fingerprint distribution is less than a threshold value.

Example 13. The system of example 11, the instructions when executed by the processing circuitry cause the processing circuitry to: generate a density from the voltage waveform; and generate the observed distribution from the density.

Example 14. The system of example 11, the instructions when executed by the processing circuitry cause the processing circuitry to: identify a message transmitted on a communication bus; observe voltage signals on the communication bus associated with transmission of the message; and generate the voltage waveform based on the observed voltage signals.

Example 15. The system of example 14, wherein the communication bus is an in-vehicle network.

Example 16. The system of example 14, comprising observation circuitry arranged to observe the voltage signals at a point on the communication bus.

Example 17. The system of example 11, the instructions when executed by the processing circuitry cause the processing circuitry to: look up an ECU identification (ID) associated with the fingerprint distribution; and identify the ECU based on the ECU ID.

Example 18. The system of example 11, the memory comprising the fingerprint, the fingerprint comprising a plurality of fingerprint distributions and a plurality of ECU IDs associated with the plurality of fingerprint distributions.

Example 19. The system of example 11, the instructions when executed by the processing circuitry cause the processing circuitry to flag an unidentified ECU based on a determination that the observed distribution does not match the fingerprint distribution.

Example 20. The system of example 11, the instructions when executed by the processing circuitry cause the processing circuitry to: determine whether an ECU ID associated with the observed distribution matches an ECU ID associated with a message associated with the voltage waveform; and flag a masquerading ECU based on a determination that the observed distribution does match the fingerprint distribution but that the ECU ID associated with the observed distribution does not match an ECU ID associated with the message.

Example 21. At least one non-transitory computer-readable storage device comprising instructions that when executed by processing circuitry cause the processing circuitry to: process a voltage waveform observed on an in-vehicle network (IVN) to generate an observed distribution from the voltage waveform; determine whether the observed distribution matches a fingerprint distribution from a fingerprint; and identify an electronic control unit (ECU) associated with the fingerprint distribution based on a determination that the observed distribution matched the fingerprint distribution.

Example 22. The non-transitory computer-readable storage device of example 21, comprising instructions that when executed by the processing circuitry cause the processing circuitry to: derive a distance between the observed distribution and a plurality of fingerprint distributions from the fingerprint based on a minimum mean squared error, the plurality of fingerprint distributions comprising the fingerprint distribution; and determine whether the observed distribution matched the fingerprint distribution based on determination that the distance between the observed distribution and the fingerprint distribution is less than a threshold value.

Example 23. The non-transitory computer-readable storage device of example 21, comprising instructions that when executed by the processing circuitry cause the processing circuitry to: generate a density from the voltage waveform; and generate the observed distribution from the density.

Example 24. The non-transitory computer-readable storage device of example 21, comprising instructions that when executed by the processing circuitry cause the processing circuitry to: identify a message transmitted on a communication bus; observe voltage signals on the communication bus associated with transmission of the message; and generate the voltage waveform based on the observed voltage signals.

Example 25. The non-transitory computer-readable storage device of example 21, wherein the communication bus is an in-vehicle network.

Example 26. The non-transitory computer-readable storage device of example 21, comprising instructions that when executed by the processing circuitry cause the processing circuitry to: look up an ECU identification (ID) associated with the fingerprint distribution; and identify the ECU based on the ECU ID.

Example 27. The non-transitory computer-readable storage device of example 21, comprising instructions that when executed by the processing circuitry cause the processing circuitry to flag an unidentified ECU based on a determination that the observed distribution does not match the fingerprint distribution.

Example 28. The non-transitory computer-readable storage device of example 21, comprising instructions that when executed by the processing circuitry cause the processing circuitry to: determine whether an ECU ID associated with the observed distribution matches an ECU ID associated with a message associated with the voltage waveform; and flag a masquerading ECU based on a determination that the observed distribution does match the fingerprint distribution but that the ECU ID associated with the observed distribution does not match an ECU ID associated with the message.

Example 29. A method, comprising: processing a voltage waveform observed on an in-vehicle network (IVN) to generate an observed distribution from the voltage waveform; determining whether the observed distribution matches a fingerprint distribution from a fingerprint; and identifying an electronic control unit (ECU) associated with the fingerprint distribution based on a determination that the observed distribution matched the fingerprint distribution.

Example 30. The method of example 29, comprising: deriving a distance between the observed distribution and a plurality of fingerprint distributions from the fingerprint based on a minimum mean squared error, the plurality of fingerprint distributions comprising the fingerprint distribution; and determining whether the observed distribution matched the fingerprint distribution based on determination that the distance between the observed distribution and the fingerprint distribution is less than a threshold value.

Example 31. The method of example 29, comprising: generating a density from the voltage waveform; and generating the observed distribution from the density.

Example 32. The method of example 29, comprising: identifying a message transmitted on a communication bus; observing voltage signals on the communication bus associated with transmission of the message; and generating the voltage waveform based on the observed voltage signals.

Example 33. The method of example 29, wherein the communication bus is an in-vehicle network.

Example 34. The method of example 29, comprising: looking up an ECU identification (ID) associated with the fingerprint distribution; and identifying the ECU based on the ECU ID.

Example 35. The method of example 29, comprising flagging an unidentified ECU based on a determination that the observed distribution does not match the fingerprint distribution.

Example 36. The method of example 29, comprising: determining whether an ECU ID associated with the observed distribution matches an ECU ID associated with a message associated with the voltage waveform; and flagging a masquerading ECU based on a determination that the observed distribution does match the fingerprint distribution but that the ECU ID associated with the observed distribution does not match an ECU ID associated with the message.

Example 37. An apparatus, comprising means arranged to implement the function of any one of examples 29 to 36.

What is claimed is:

1. An apparatus, comprising:
   processing circuitry; and
   memory coupled to the processing circuitry, the memory comprising instructions that when executed by the processing circuitry cause the processing circuitry to:
   process a voltage waveform from a communication bus;
   generate a set of histograms from the voltage waveform;
   generate a density from the set of histograms with a kernel based density function, the kernel based density function to fit the set of histograms as a sum of kernels;
   generate an observed distribution from the density of the voltage waveform with a cumulative distribution function (CDF);
   determine whether the observed distribution matches a fingerprint distribution from a fingerprint based on a minimum mean squared error; and
   identify an electronic control unit (ECU) associated with the fingerprint distribution based on a determination that the observed distribution matched the fingerprint distribution.

2. The apparatus of claim 1, the instructions when executed by the processing circuitry cause the processing circuitry to:
   derive a distance between the observed distribution and a plurality of fingerprint distributions from the fingerprint based on the minimum mean squared error, the plurality of fingerprint distributions comprising the fingerprint distribution; and
   determine whether the observed distribution matched the fingerprint distribution based on determination that the distance between the observed distribution and the fingerprint distribution is less than a threshold value.

3. The apparatus of claim 1, the instructions when executed by the processing circuitry cause the processing circuitry to:
   identify a message transmitted on a communication bus;
   observe voltage signals on the communication bus associated with transmission of the message; and
   generate the voltage waveform based on the observed voltage signals.

4. The apparatus of claim 3, wherein the communication bus is an in-vehicle network.

5. The apparatus of claim 3, comprising observation circuitry arranged to observe the voltage signals at a point on the communication bus.

6. The apparatus of claim 1, the instructions when executed by the processing circuitry cause the processing circuitry to:
   look up an ECU identification (ID) associated with the fingerprint distribution; and
   identify the ECU based on the ECU ID.

7. The apparatus of claim 1, the memory comprising the fingerprint, the fingerprint comprising a plurality of fingerprint distributions and a plurality of ECU IDs associated with the plurality of fingerprint distributions.

8. The apparatus of claim 1, the instructions when executed by the processing circuitry cause the processing circuitry to flag an unidentified ECU based on a determination that the observed distribution does not match the fingerprint distribution.

9. The apparatus of claim 1, the instructions when executed by the processing circuitry cause the processing circuitry to:
   determine whether an ECU ID associated with the observed distribution matches an ECU ID associated with a message associated with the voltage waveform; and
   flag a masquerading ECU based on a determination that the observed distribution does match the fingerprint distribution but that the ECU ID associated with the observed distribution does not match an ECU ID associated with the message.

10. A system, comprising:
    at least one electronic control unit (ECU); and
    an ECU identification sub-system coupled to the at least one ECU via an in-vehicle network (IVN), the ECU identification sub-system comprising:

processing circuitry; and
memory coupled to the processing circuitry, the memory comprising instructions that when executed by the processing circuitry cause the processing circuitry to:
process a voltage waveform from a communication bus;
generate a set of histograms from the voltage waveform;
generate a density from the set of histograms with a kernel based density function, the kernel based density function to fit the set of histograms as a sum of kernels;
generate an observed distribution from the density of the voltage waveform with a cumulative distribution function (CDF);
determine whether the observed distribution matches a fingerprint distribution from a fingerprint based on a minimum mean squared error; and
identify an electronic control unit (ECU) associated with the fingerprint distribution based on a determination that the observed distribution matched the fingerprint distribution.

11. The system of claim 10, the instructions when executed by the processing circuitry cause the processing circuitry to:
derive a distance between the observed distribution and a plurality of fingerprint distributions from the fingerprint based on the minimum mean squared error, the plurality of fingerprint distributions comprising the fingerprint distribution; and
determine whether the observed distribution matched the fingerprint distribution based on determination that the distance between the observed distribution and the fingerprint distribution is less than a threshold value.

12. The system of claim 10, the instructions when executed by the processing circuitry cause the processing circuitry to:
identify a message transmitted on a communication bus;
observe voltage signals on the communication bus associated with transmission of the message; and
generate the voltage waveform based on the observed voltage signals.

13. The system of claim 12, wherein the communication bus is an in-vehicle network.

14. The system of claim 12, comprising observation circuitry arranged to observe the voltage signals at a point on the communication bus.

15. The system of claim 10, the instructions when executed by the processing circuitry cause the processing circuitry to:
look up an ECU identification (ID) associated with the fingerprint distribution; and
identify the ECU based on the ECU ID.

16. The system of claim 10, the instructions when executed by the processing circuitry cause the processing circuitry to flag an unidentified ECU based on a determination that the observed distribution does not match the fingerprint distribution.

17. The system of claim 10, the instructions when executed by the processing circuitry cause the processing circuitry to:
determine whether an ECU ID associated with the observed distribution matches an ECU ID associated with a message associated with the voltage waveform; and
flag a masquerading ECU based on a determination that the observed distribution does match the fingerprint distribution but that the ECU ID associated with the observed distribution does not match an ECU ID associated with the message.

18. At least one non-transitory computer-readable storage device comprising instructions that when executed by processing circuitry cause the processing circuitry to:
process a voltage waveform observed on an in-vehicle network (IVN);
generate a set of histograms from the voltage waveform;
generate a density from the set of histograms with a kernel based density function, the kernel based density function to fit the set of histograms as a sum of kernels;
generate an observed distribution from the density of the voltage waveform with a cumulative distribution function (CDF);
determine whether the observed distribution matches a fingerprint distribution from a fingerprint based on a minimum mean squared error; and
identify an electronic control unit (ECU) associated with the fingerprint distribution based on a determination that the observed distribution matched the fingerprint distribution.

19. The non-transitory computer-readable storage device of claim 18, comprising instructions that when executed by the processing circuitry cause the processing circuitry to:
derive a distance between the observed distribution and a plurality of fingerprint distributions from the fingerprint based on the minimum mean squared error, the plurality of fingerprint distributions comprising the fingerprint distribution; and
determine whether the observed distribution matched the fingerprint distribution based on determination that the distance between the observed distribution and the fingerprint distribution is less than a threshold value.

20. The non-transitory computer-readable storage device of claim 18, comprising instructions that when executed by the processing circuitry cause the processing circuitry to:
look up an ECU identification (ID) associated with the fingerprint distribution; and
identify the ECU based on the ECU ID.

21. The non-transitory computer-readable storage device of claim 18, comprising instructions that when executed by the processing circuitry cause the processing circuitry to flag an unidentified ECU based on a determination that the observed distribution does not match the fingerprint distribution.

22. The non-transitory computer-readable storage device of claim 18, comprising instructions that when executed by the processing circuitry cause the processing circuitry to:
determine whether an ECU ID associated with the observed distribution matches an ECU ID associated with a message associated with the voltage waveform; and
flag a masquerading ECU based on a determination that the observed distribution does match the fingerprint distribution but that the ECU ID associated with the observed distribution does not match an ECU ID associated with the message.

* * * * *